United States Patent
Ro et al.

(10) Patent No.: US 9,647,257 B2
(45) Date of Patent: May 9, 2017

(54) BATTERY PACK

(71) Applicant: Samsung SDI Co., Ltd., Yongin-si, Gyeonggi-do (KR)

(72) Inventors: Hun-Tae Ro, Yongin-si (KR); Ji-Hwan Seol, Yongin-si (KR)

(73) Assignee: Samsung SDI Co., Ltd., Gyeonggi-do (KR)

(*) Notice: Subject to any disclaimer, the term of this patent is extended or adjusted under 35 U.S.C. 154(b) by 0 days.

(21) Appl. No.: 14/602,063

(22) Filed: Jan. 21, 2015

(65) Prior Publication Data
US 2015/0243958 A1    Aug. 27, 2015

(30) Foreign Application Priority Data

Feb. 21, 2014    (KR) .................. 10-2014-0019962

(51) Int. Cl.
*H01M 2/34* (2006.01)
*H01M 10/42* (2006.01)
*H01M 10/052* (2010.01)
*H01M 10/48* (2006.01)

(52) U.S. Cl.
CPC .......... *H01M 2/34* (2013.01); *H01M 10/425* (2013.01); *H01M 10/4207* (2013.01); *H01M 10/482* (2013.01); *H01M 10/052* (2013.01); *H01M 2010/4271* (2013.01); *H01M 2200/00* (2013.01); *H01M 2220/20* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 6,494,734 B1 | 12/2002 | Shuey | |
| 8,350,528 B2 | 1/2013 | Yang et al. | |
| 2009/0017366 A1* | 1/2009 | Wood | B60L 11/1874 429/62 |
| 2011/0129705 A1* | 6/2011 | Lee | H01M 2/34 429/90 |
| 2012/0225327 A1* | 9/2012 | Ma | H01M 2/14 429/7 |
| 2013/0288096 A1* | 10/2013 | Frutschy | H01M 2/1088 429/99 |
| 2015/0099151 A1* | 4/2015 | Lavender | H01M 2/204 429/121 |

FOREIGN PATENT DOCUMENTS

| | | |
|---|---|---|
| KR | 10-1999-0030277 A | 4/1999 |
| KR | 10-2007-0105220 A | 10/2007 |

* cited by examiner

*Primary Examiner* — Patrick Ryan
*Assistant Examiner* — Christopher Domone
(74) *Attorney, Agent, or Firm* — Knobbe, Martens, Olson & Bear, LLP

(57) ABSTRACT

A battery pack is disclosed. In one aspect, the battery pack includes a plurality of battery cells and a monitoring portion including a plurality of lines respectively electrically connected to the battery cells. The lines include a positive current line, a negative current line, and at least one monitoring line. The battery pack further includes a connector including a plurality of connector pins formed therein, wherein the connector pins are respectively electrically connected to the lines of the monitoring portion, and a protective circuit module accommodating the connector therein. The connector pins have different lengths.

20 Claims, 5 Drawing Sheets

BATTERY PACK

CROSS-REFERENCE TO RELATED APPLICATIONS

This application claims priority to and the benefit of Korean Patent Application No. 10-2014-0019962, filed on Feb. 21, 2014, in the Korean Intellectual Property Office, the entire contents of which are incorporated herein by reference in their entirety.

BACKGROUND

Field

The described technology generally relates to a battery pack.

Description of the Related Technology

In general, unlike primary batteries, secondary batteries are rechargeable. Thus, secondary batteries are applied to various fields such as digital cameras, cellular phones, notebook computers, and hybrid vehicles, and studies on secondary batteries are actively conducted. Examples of secondary batteries include nickel-cadmium batteries, nickel-metal hybrid batteries, nickel-hydrogen batteries, lithium secondary batteries, and the like.

Lithium secondary batteries are frequently used as the power source of electric or hybrid electric vehicles. Such power sources are required to supply high power during activities such as driving a motor. Accordingly, a high-capacity battery pack including a plurality of high-power battery cells or battery modules connected together is typically used as a power source for these high power applications.

As described above, the battery pack ordinarily includes a plurality of battery cells connected in series. Particularly, battery packs used for hybrid electric vehicles, can include up to a few tens of battery cells which are alternately charged and discharged. Such charging and discharging of the battery cells should be controlled. Accordingly, each of the battery cells should be managed to maintain an appropriate operating state.

SUMMARY OF CERTAIN INVENTIVE ASPECTS

One inventive aspect is a battery pack including a plurality of battery cells that are electrically connected.

Another aspect is a battery pack in which the connector pins connected to a monitoring portion of a plurality of battery cells are formed to have different lengths so that the connector pins can be sequentially connected to a protective circuit module when connecting the connector to the protective circuit module.

Another aspect is a battery pack, including: a plurality of battery cells; a monitoring portion configured to have one side connected to each of the plurality of battery cells, the monitoring portion including a B+ high current line, a B− high current line and at least one monitoring line; a connector connected to the other side of the monitoring portion, the connector having a plurality of connector pins formed therein; and a protective circuit module configured to have a connector accommodating portion for accommodating the connector therein, wherein the plurality of connector pins are formed in different lengths.

The connector pin of the connector, connected to the B+ or B− high current line, may be formed longer than that connected to the monitoring line.

The connector pin of the connector, connected to the B− high current line, may be formed longer than that of the connector, connected to the B+ high current line.

The connector pins of the connector, connected to the monitoring lines, may be formed to have different lengths.

The connector pins of the connector, connected to the monitoring lines, may be formed to have substantially the same length.

A connection tab may be formed to connect between adjacent battery cells among the plurality of battery cells. The connection tab may be connected to the one side of the monitoring portion.

The monitoring portion may be formed in a wire shape.

The outer surface of the monitoring portion may be formed to be surrounded by an insulating member for the purpose of insulation from an exterior.

The protective circuit module may include a battery management system (BMS).

The plurality of connector pins may be formed to have different lengths according to specifications of an analog front end integrated circuit (AFE IC).

Another aspect is a battery pack including a plurality of battery cells, a monitoring portion including a plurality of lines respectively electrically connected to the battery cells, wherein the lines comprise a positive current line, a negative current line, and at least one monitoring line, a connector including a plurality of connector pins formed therein, wherein the connector pins are respectively electrically connected to the lines of the monitoring portion, and a protective circuit module accommodating the connector therein, wherein the connector pins have different lengths.

The connector pins can include first and second connector pins respectively connected to the positive and negative current lines and at least one of the first and second connector pins can be longer than the connector pin connected to the monitoring line. The connector pins can further include at least one additional connector pin and the second connector pin can be longer than the first connector pin. The second connector pin can be the longest connector pin and the first connector pin can be the shortest connector pin. The at least one monitoring line can include a plurality of monitoring lines, wherein the connector pins including a plurality of monitoring connector pins respectively electrically connected to the monitoring lines, and wherein the lengths of each of the monitoring connector pins are defined between the lengths of the first and second connector pins. The connector can have first and second ends opposing each other, wherein the connector pins are sequentially arranged in a direction from the first end to the second end, and wherein at least one of the first and second connector pins is located adjacent to one of the first and second ends.

The lengths of the monitoring connector pins can increase in a direction from the first connector pin to the second connector pin. The at least one monitoring line can include a plurality of monitoring lines and the connector pins connected to the monitoring lines can have different lengths. The at least one monitoring line can include a plurality of monitoring lines and the connector pins connected to the monitoring lines can have substantially the same length. The battery pack can further include a plurality of connection tabs respectively electrically connecting adjacent battery cells, wherein the lines of the monitoring portion are electrically connected to the battery cells via the connection tabs. The battery pack can further include an electrically insulating member surrounding an outer surface of the monitoring portion. The protective circuit module can include a battery management system (BMS). The protective circuit module can include an analog front end integrated circuit (AFE IC) and the lengths of the connector pins can be defined based on the configuration of the AFE IC.

Another aspect is a battery pack including a plurality of battery cells at least partially connected in series so as to have a positive end and a negative end, a connector configured to be connected to a protective circuit module and comprising a plurality of connector pins, wherein the connector pins have different lengths, and a plurality of wires respectively electrically connecting the battery cells to the connector pins, wherein the wires include a positive current wire electrically connected to the positive end of the battery cells, a negative current wire electrically connected to the negative end of the battery cells, and a plurality of monitoring wires electrically connected to the battery cells between the positive and negative ends.

The connector pins can include a first connector pin electrically connected to the positive current wire, a second connector pin electrically connected to the negative current wire, and a plurality of monitoring connector pins respectively electrically connected to the monitoring wires, wherein the length of the first connector pin is greater than that of the other connector pins and wherein the length of the second connector pin is less than that of the other connector pins. The connector pins can be sequentially arranged and the monitoring connector pins can be interposed between the first and second connector pins. The lengths of the monitoring connector pins can increase in a direction from the first connector pin to the second connector pin. The connector can have first and second ends opposing each other, wherein the connector pins are sequentially arranged, wherein the first connector pin is adjacent to one of the first and second ends of the connector, and wherein the second connector pin is positioned near the middle of the connector. The lengths of the monitoring connector pins can decease as the distance between the monitoring connector pins and the second connector pin increases. The monitoring connector pins can have substantially the same length.

According to at least one embodiment, as the connector pins connected to the monitoring portion of the plurality of battery cells are formed to have different lengths according to the specifications of the AFE IC, the connector pins are sequentially connected to the protective circuit module when connecting the connector to the protective circuit module, so that the failure occurrence rate of the protective circuit module including the BMS, etc. can be reduced.

Further, the occurrence of errors in a power relay assembly (PRA; connection between a driving switch and battery) can also be reduced, thereby contributing to the stability of the battery pack.

DETAILED DESCRIPTION OF CERTAIN INVENTIVE EMBODIMENTS

Figure 1:
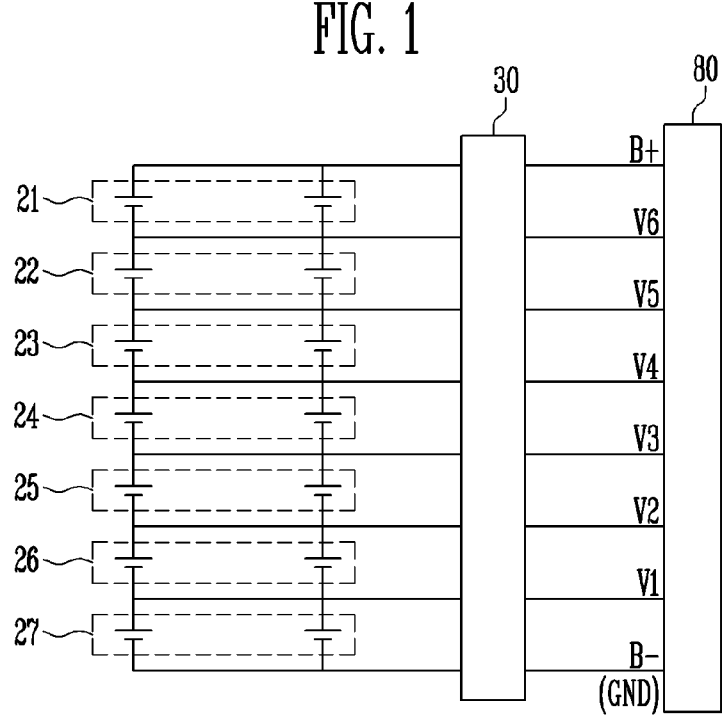
FIG. 1 is a schematic circuit diagram of a battery pack according to an embodiment.

The battery cells included in the standard battery pack are electrically connected by electrode tabs. A sensing line can be connected to the electrode tabs so as to measure voltage, temperature, etc. of each battery cell. The sensing line can be connected to a protective circuit module through a connector.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the embodiments to those skilled in the art.

In the drawings, the dimensions of components may be exaggerated for clarity of illustration. It will be understood that when an element is referred to as being "between" two elements, it can be the only element between the two elements, or one or more intervening elements may also be present. Like reference numerals refer to like elements throughout.

In the following detailed description, only certain exemplary embodiments have been shown and described, simply by way of illustration. As those skilled in the art would realize, the described embodiments may be modified in various different ways, all without departing from the spirit or scope of the described technology. Accordingly, the drawings and description are to be regarded as illustrative in nature and not restrictive. In addition, when an element is referred to as being "on" another element, it can be directly on the other element or be indirectly on the other element with one or more intervening elements interposed therebetween. Also, when an element is referred to as being "connected to" another element, it can be directly connected to the other element or be indirectly connected to the other element with one or more intervening elements interposed therebetween. Hereinafter, like reference numerals refer to like elements. In the drawings, the thicknesses or sizes of layers may be exaggerated for the sake of clarity and are not necessarily drawn to scale. The term "substantially" as used in this disclosure can include the meanings of completely, almost completely, or to any significant degree in some applications and in accordance with the understanding of those skilled in the art.

Figure 2:
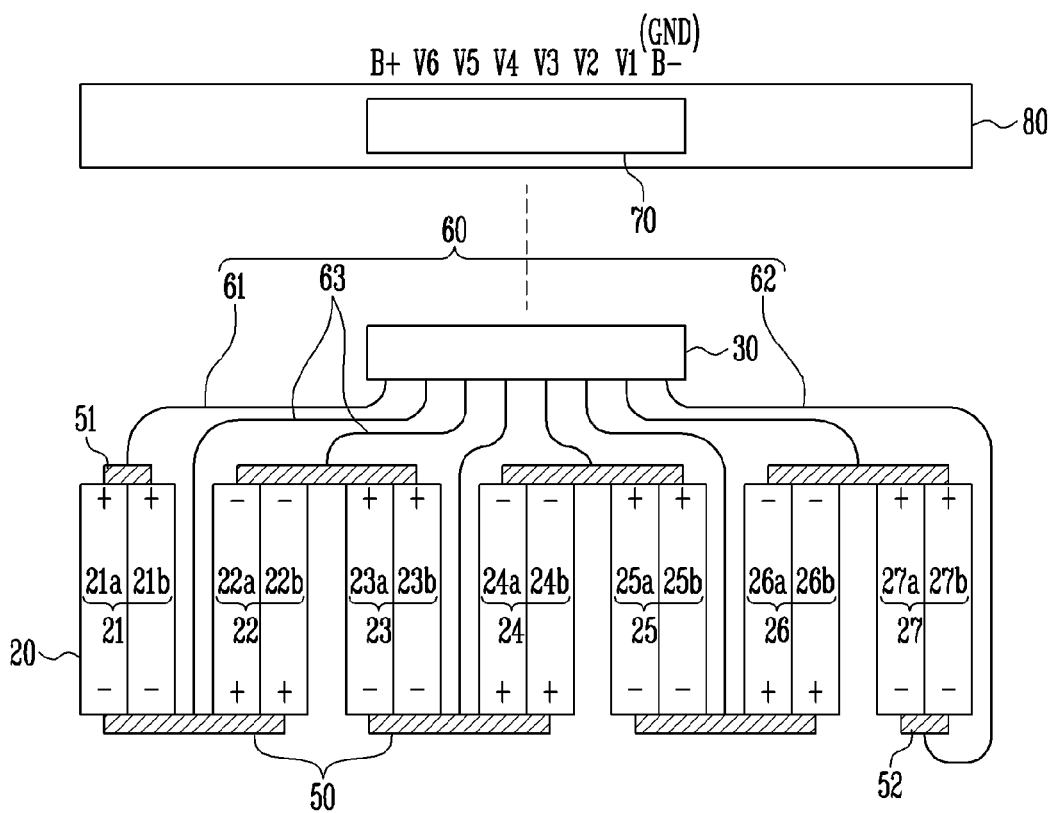
FIG. 2 a plan view showing a battery pack according to an embodiment.

Referring to FIGS. 1 and 2, the battery pack according to an embodiment includes one or more banks 21, 22, 23, 24, 25, 26, and 27 in which a plurality of battery cells 21a, 21b, 22a, 22b, 23a, 23b, 24a, 24b, 25a, 25b, 26a, 26b, 27a, and 27b (hereinafter, referred to as 20) are connected, and at least one or more conductive connection tabs 50 electrically connecting the banks. The battery pack further includes a B+ high current line or positive current line 61, a B− high current line or negative current line 62, a monitoring line 63, a protective circuit module 80, and a connector 30.

Here, the connection tab 50 connects adjacent battery cells 20 and is connected to one side of a monitoring portion 60. The connector 30 is connected to the other side of the monitoring portion 60 and a connector accommodating portion 70 is formed in the protective circuit module 80 and is configured to have the connector 30 inserted therein.

In some embodiments, the monitoring portion 60 is formed of a plurality of wires and the outer surface of the monitoring portion 60 is surrounded by an insulating member (not shown) electrically insulating the monitoring portion 60. The monitoring portion 60 includes a B+ high current line 61, a B− high current line 62, and at least one or more monitoring lines 63. In some embodiments, at least one of connector pins 31 and 32 (see FIG. 3A) respectively electrically connected to the B+ and B− high current line 61 and 62 is formed to be longer than a connector pin or monitoring connector pin 33 (see FIG. 3A) connected to the monitoring line 63. The connector pin 32 connected to the B− high current line 62 can be formed to be longer than the connector pin 31 connected to the B+ high current line 61.

The connector pins 31, 32, and 33 may be formed to have different lengths. For example, the connector pins 31, 32, and 33 may be formed to have different lengths according to specifications of an analog front end integrated circuit (AFE IC). Accordingly, the B+ high current line 61, the B− high current line 62, and the monitoring line 63 positioned therebetween can be sequentially connected when the connector 30 is connected to the protective circuit module 80. In some embodiments, the protective circuit module 80 includes the AFE IC.

The description of the lengths of the connector pins will be described in detail with reference to figures FIGS. 3A and 3B through FIGS. 6A and 6B.

In the described technology, the bank having a plurality of battery cells connected therein may include a first bank 21, a second bank 22, a third bank 23, a fourth bank 24, a fifth bank 25, a sixth bank 26, and a seventh bank 27, as shown in the embodiment of FIG. 1. A plurality of battery cells 20 are connected in parallel in each of the banks 21 to 27, and the banks 21 to 27 are connected in series. Although seven banks 21 to 27 have been illustrated in the figures, the number of banks 21 to 27 is not limited in the described technology. In addition, although each of the banks 21 to 27 includes two battery cells 20, the number of battery cells 20 is not limited in the described technology.

In some embodiments, opposing side surfaces of each battery cell 20 have different polarities from each other. In these embodiments, the side surface of the battery cell 20, which has a convex terminal shape (not shown), represents a positive electrode and the flat side surface of the battery cell 20, which is opposite to the side surface having the convex terminal shape, represents a negative electrode.

The connection tabs 50 are formed to connect adjacent banks of the banks 21 to 27 in series and connection tabs 51 and 52 are respectively connected in parallel to the battery cells 21a, 21b, 27a, and 27b of the first and seventh banks 21 and 27 positioned at both ends of the banks 21 to 27. The number of connection tabs 50 connecting the adjacent banks of the banks 21 to 27 as described above increases as the number of banks 21 to 27 used increases.

The B+ high current line 61 can be welded to the connection tab 51 of the maximum power region of the first bank 21 and the B− high current line 62 can be welded to the connection tab 52 of the minimum power region of the seventh bank 27. In addition to the B+ and B− high current lines 61 and 62, according to some embodiments, the monitoring line 63 includes six monitoring lines. One monitoring line 63 can be soldered to the connection tab 50 which is connected between a (−) terminal of the first bank 21 and a (+) terminal of the second bank 22. Similarly, another monitoring line 63 can be soldered to the connection tab 50 which is connected between a (−) terminal of the second bank 22 and a (+) terminal of the third bank 23. The remaining monitoring lines 63 can be soldered in a similar manner to the connection tabs 50 up to the seventh bank 27. The number of monitoring lines 63 increases as the number of banks 21 to 27 and the number of the connection tabs 50 increases.

The connector accommodating portion 70, into which the connector 30 connected to the other end of the monitoring portion 60 is inserted, is formed in the protective circuit module 80. The B+ high current line 61 is connected to a B+ high current terminal of the protective circuit module 80 and the B− high current line 62 is connected to a B− high current terminal of the protective circuit module 80 via the connector 30. Here, the protective circuit module 80 includes a battery management system (BMS).

As such, the total current of the electrically connected battery cells 20 is supplied to the protective circuit module 80 via the connector 30 through the B+ high current line 61, the B− high current line 62, and the monitoring lines 63.

Although not shown in these figures, the protective circuit module 80 can include P+ and P− terminals formed at an upper portion thereof. The P+ and P− terminals are portions that can be connected to an external charger or external load. In addition, information such as the voltage of the battery cells 20 is received through the AFE IC and then can be transmitted to an external system.

As the connector pins 31, 32, and 33 of the connector 30 connected to the protective circuit module 80 are formed with difference lengths according to the specifications of the AFE IC as described above, the connector pins 31, 32, and 32 can be sequentially connected when the connector 30 is connected to the protective circuit module 80, thereby reducing the likelihood of failure of the AFE IC.

Figure 3A:
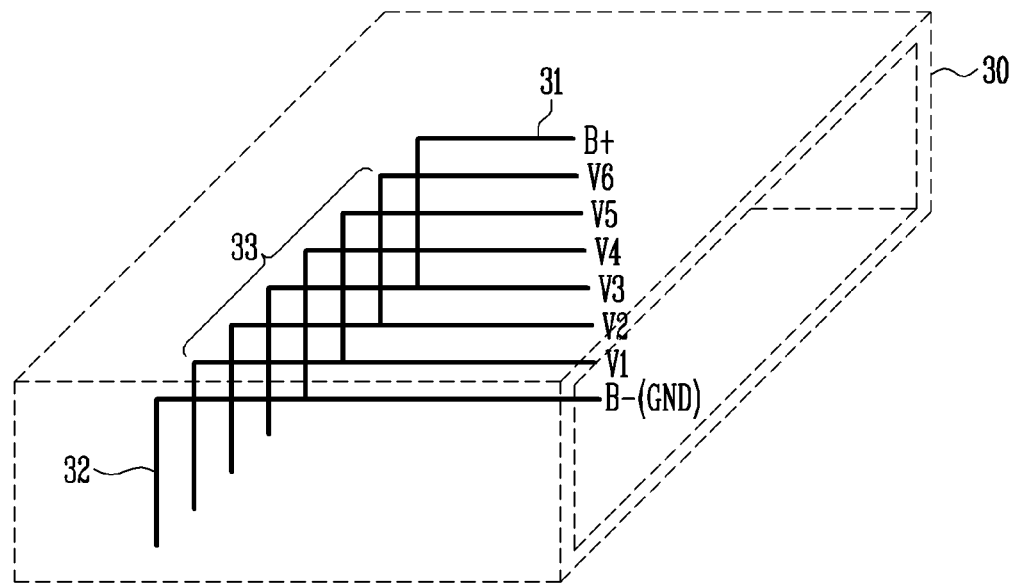
FIG. 3A is a perspective view showing a connector according to a first embodiment.
Figure 3B:
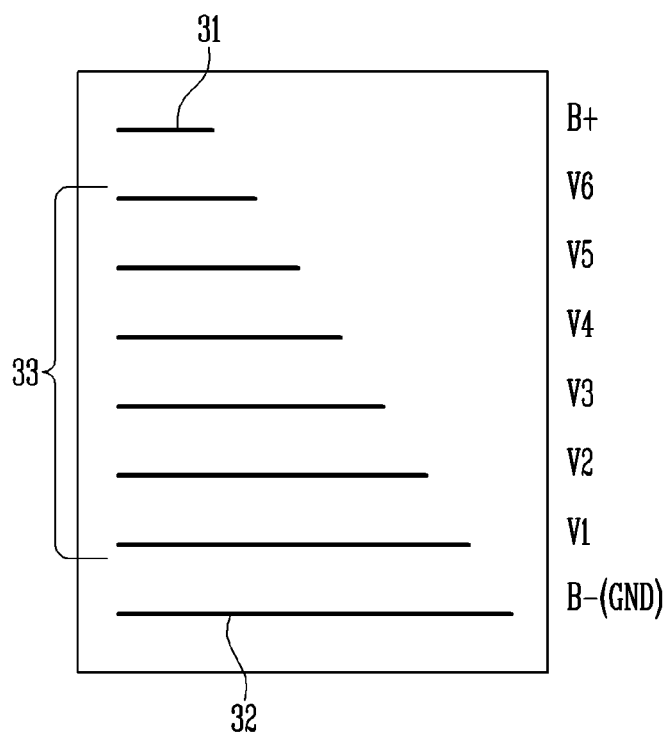
FIG. 3B is a plan view showing the lengths of the connector pins of FIG. 3A.

Referring to FIGS. 3A and 3B, the connector pins 31, 32, and 33 formed in the connector 30 are respectively connected to a plurality of banks that constitute an assembly of the battery cells 20 (see FIG. 2). The connector pin 31 connected to the B+ high current line and the connector pin 32 connected to the B− high current line are respectively positioned at both ends of the connector 30. Here, the connector pin 31 connected to the B+ high current line is positioned at the top of the figures and the connector pin 32 connected to the B− high current line is positioned at the bottom of the figures. The other connector pins 33 connected to the monitoring lines are positioned between the connector pins 31 and 32 which are respectively connected to the B+ and B− high current lines.

In this embodiment, the lengths of the connector pins 33 connected to the monitoring lines gradually increase from the connector pin 31 connected to the B+ high current line to the connector pin 32 connected to the B− high current line.

In the embodiment of FIGS. 3A and 3B, the connector pins 31, 32, and 33 are formed to have different lengths. For example, the connector pins 31, 32, and 33 can be formed to have different lengths according to the specifications of the AFE IC.

That is, in the first embodiment, the connector pin 31 connected to the B+ high current line is shorter than the connector pin 32 connected to the B− high current line. Moreover, the connector pin 31 connected to the B+ high current line is shorter than the connector pins 33 connected to the monitoring lines, which are positioned in the middle of the connector 30.

In some embodiments, as shown in FIGS. 3A and 3B, the connector pin 32 connected to the B− high current line has the greatest length of all the connector pins 31, 32, and 33. The connector pins 33 connected to the monitoring lines between the connector pin 31 connected to the B+ high current line and the connector pin 32 connected to the B− high current line are sequentially formed so that the lengths of the each of the connector pins 33 are different.

Thus, when the connector 30 is connected to the connector accommodating portion 70 of the protective circuit module 80, the connector pins 31, 32, and 33 are sequentially connected to the connector accommodating portion 70, starting with the connector pin 32 connected to the B− high current line. Accordingly, the internal cell balancing field effect transistor (FET) included in each bank can be prevented from being damaged due to a high voltage applied to the internal FET. Further, it is possible to easily perform open circuit voltage (OCV) measurement and to prevent a failure caused by a worker's mistake.

In some embodiments, the connector pins 31, 32, and 33 of the connector 30 are formed to have different lengths so that the number of failures of the AFE IC in the connection between the connector 30 and the protective circuit module 80 can be reduced.

Figure 4A:
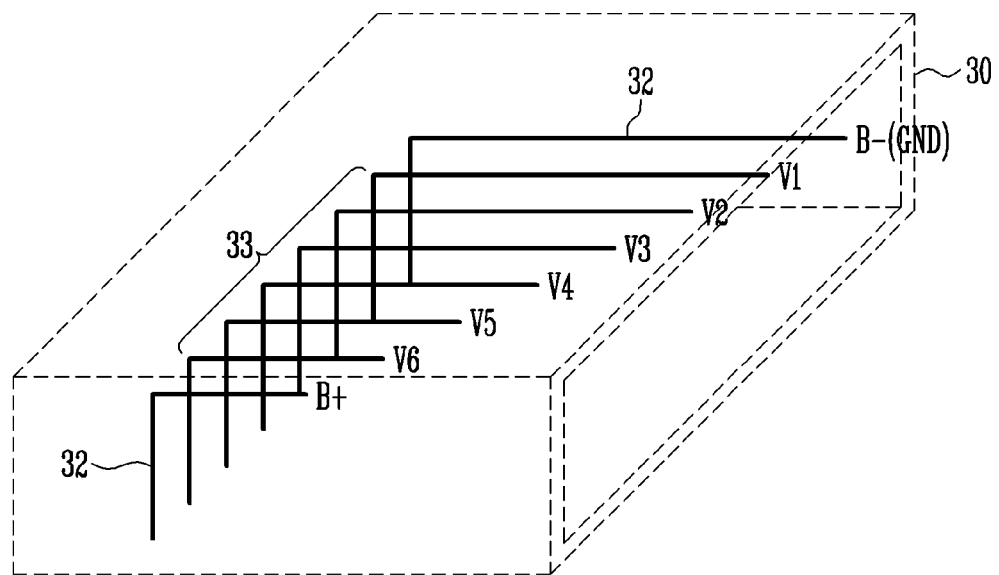
FIG. 4A is a perspective view showing a connector according to a second embodiment.
Figure 4B:
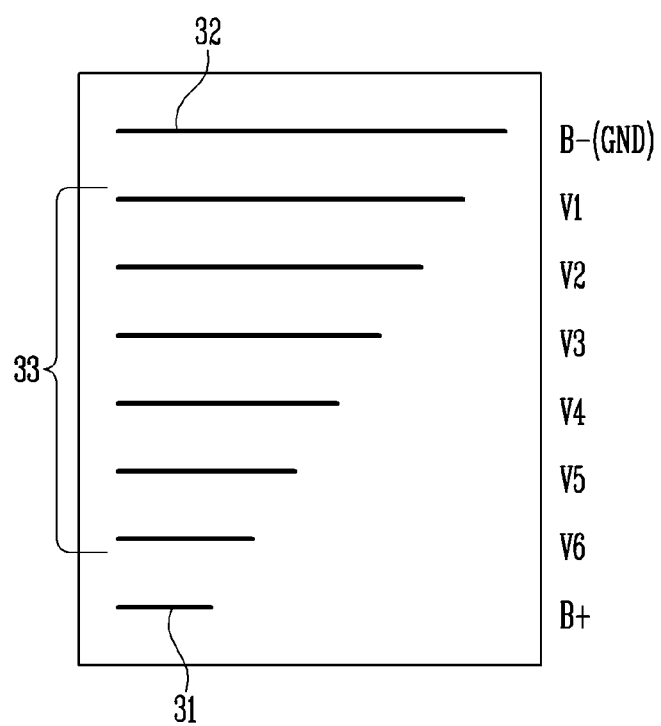
FIG. 4B is a plan view showing the lengths of the connector pins of FIG. 4A.

Referring to FIGS. 4A and 4B, like the aforementioned embodiment, the connector pin 31 connected to the B+ high current line is shorter than the connector pin 32 connected to the B− high current line. However, the connector pin 32 connected to the B− high current line is positioned at the top of these figures and the connector pin 31 connected to the B+ high current line is positioned at the bottom of these figures. The other connector pins 33 connected to the monitoring lines are positioned between the connector pin 32 connected to the B− high current line and the connector pin 31 connected to the B+ high current line.

In this embodiment, the connector pin 31 connected to the B+ high current line has the shortest length among all the connector pins 31, 32, and 33. The connector pin 32 connected to the B− high current line can have the greatest length among all the connector pins 31, 32, and 33. The connector pins 33 connected to the monitoring lines between the connector pins 31 and 32 respectively connected to the B+ and B− high current lines are sequentially formed so that the lengths of each of the connector pins 33 are different.

In this embodiment, the lengths of the connector pins 33 connected to the monitoring lines gradually increase from the connector pin 31 connected to the B+ high current line to the connector pin 32 connected to the B− high current line. That is, this embodiment is substantially identical to the aforementioned embodiment in that the connector pin 32 connected to the B− high current line is the longest and the connector pin 31 connected to the B+ high current line is the shortest. However, the connector pins 31, 32, and 33 are arranged in the opposite direction compared to the aforementioned embodiment of FIGS. 3A and 3B.

Figure 5A:
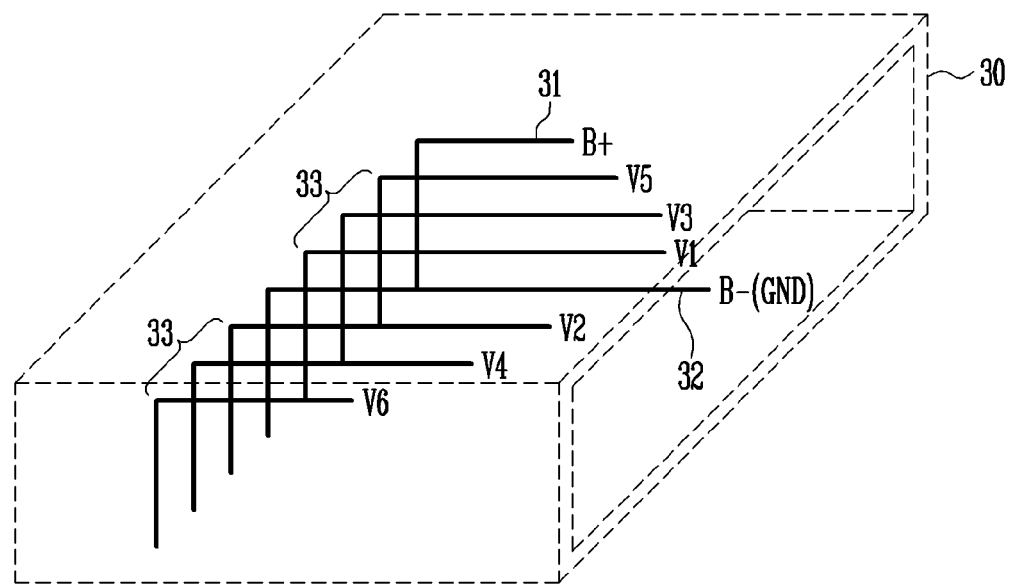
FIG. 5A is a perspective view showing a connector according to a third embodiment.
Figure 5B:
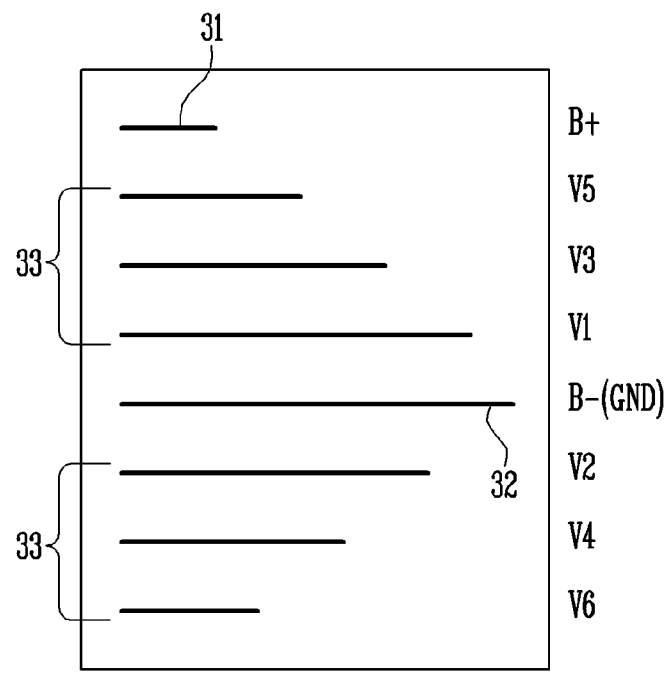
FIG. 5B is a plan view showing the lengths of the connector pins of FIG. 5A.

Referring to FIGS. 5A and 5B, among the connector pins 31, 32, and 33 of the connector 30, the connector pin 32 connected to the B− high current line is positioned near the middle of the connector 30. The connector pins 33 connected to the monitoring lines are positioned on both sides of the connector pin 32. In this embodiment, the lengths of the connector pins 33 gradually decrease as the connector pins 33 are positioned farther from the connector pin 32 connected to the B− high current line.

Finally, the connector pin 31 connected to the B+ high current line is positioned at one end of the connector 30. In the embodiment of FIGS. 5A and 5B, the connector pin 31 connected to B+ high current line has the shortest length. Here, the connector pins 33 connected to the monitoring lines are sequentially formed so that the lengths of the connector pins 33 are different according to the specifications of the AFE IC. In some embodiments, the connector pin positioned in the middle is formed to have the greatest length among all of the connector pins 31, 32, and 33, and the lengths of the connector pins are formed to gradually decrease as the connector pins approach both ends of the connector 30.

In some embodiments, as shown in FIGS. 5A and 5B, each of the connector pins 33 connected to the monitoring lines has a different length. In other embodiments, the connector pins 33 that are substantially equally distant from the connector pin 32 connected to the B− high current line have substantially the same length (not illustrated). In these embodiments, the lengths of the connector pins 31, 32, and 33 gradually decrease as the connector pins are located further away from the connector pin 32 connected to the B− high current line.

Figure 6A:
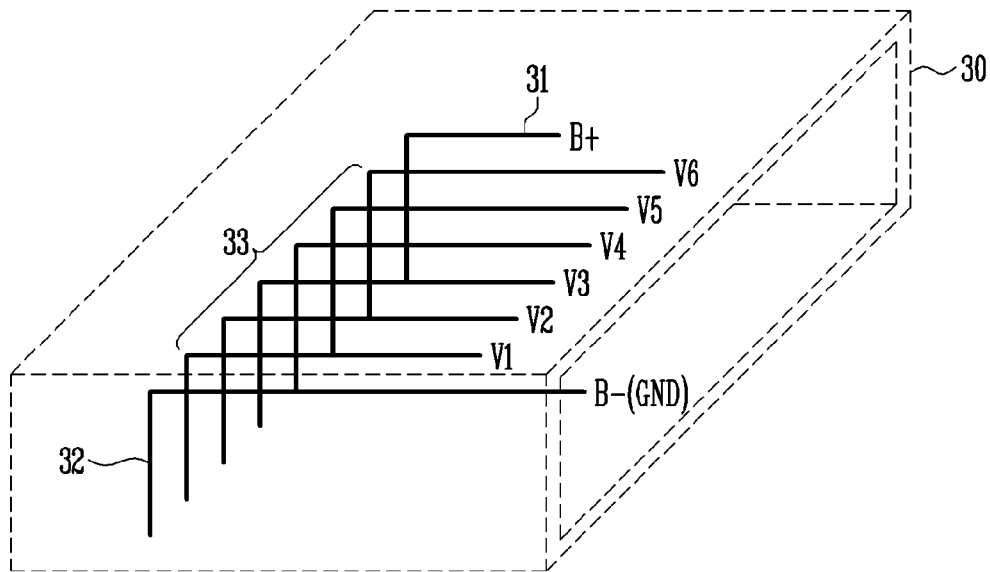
FIG. 6A is a perspective view showing a connector according to a fourth embodiment.
Figure 6B:
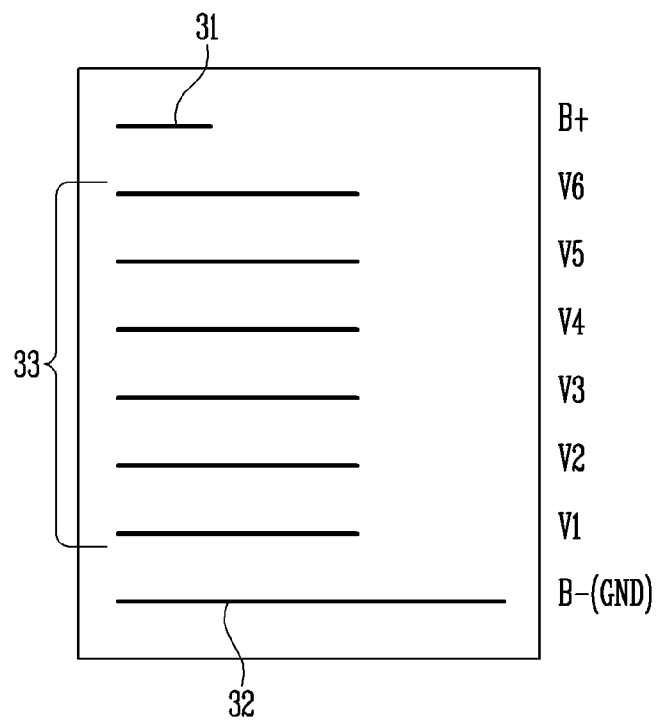
FIG. 6B is a plan view showing the lengths of the connector pins of FIG. 6A.

Referring to FIGS. 6A and 6B, like the aforementioned embodiments, the connector pin 31 connected to the B+ high current line is shorter than the connector pin 32 connected to the B− high current line. The other connector pins 33 connected to the monitoring lines are positioned between the connector pin 32 connected to the B− high current line and the connector pin 31 connected to the B+ high current line.

In this embodiment, the connector pins 33 connected to the monitoring lines all have substantially the same length. The connector pin 31 connected to the B− high current line is the shortest among all the connector pins 31, 32, and 33. The connector pin 32 connected to the B− high current line is the longest among all the connector pins 31, 32, and 33.

In the aforementioned embodiments, a battery pack having the configuration of a 7 series 2 parallel (7S 2P) has been described as an example, but it will be apparent that the described technology can be applied to battery packs of various serial and/or parallel structures. In the aforementioned embodiments, the connector pins are formed to have different lengths, but it will be apparent that the connector pins can be formed with lengths that are different than described in connection with the aforementioned embodiments.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:
1. A battery pack, comprising:
a plurality of battery cells;
a monitoring portion including a plurality of lines respectively electrically connected to the battery cells, wherein the lines comprise a positive current line, a negative current line, and at least one monitoring line;

a connector including a plurality of connector pins formed therein, wherein the connector pins are respectively electrically connected to the lines of the monitoring portion; and a protective circuit module accommodating the connector therein, wherein the connector pins have different lengths, and wherein the connector pins are configured to be electrically connected to the protective circuit module in a sequential order when the connector is inserted into the protective circuit module.

2. The battery pack of claim 1, wherein the connector pins include first and second connector pins respectively connected to the positive and negative current lines and wherein at least one of the first and second connector pins is longer than the connector pin connected to the monitoring line.

3. The battery pack of claim 2, wherein the connector pins further include at least one additional connector pin and wherein the second connector pin is longer than the first connector pin.

4. The battery pack of claim 2, wherein the second connector pin is the longest connector pin and wherein the first connector pin is the shortest connector pin.

5. The battery pack of claim 4, wherein the at least one monitoring line includes a plurality of monitoring lines, wherein the connector pins including a plurality of monitoring connector pins respectively electrically connected to the monitoring lines, and wherein the lengths of each of the monitoring connector pins are defined between the lengths of the first and second connector pins.

6. The battery pack of claim 5, wherein the connector has first and second ends opposing each other, wherein the connector pins are sequentially arranged in a direction from the first end to the second end, and wherein at least one of the first and second connector pins is located adjacent to one of the first and second ends.

7. The battery pack of claim 6, wherein the lengths of the monitoring connector pins increase in a direction from the first connector pin to the second connector pin.

8. The battery pack of claim 1, wherein the at least one monitoring line includes a plurality of monitoring lines and wherein the connector pins connected to the monitoring lines have different lengths.

9. The battery pack of claim 1, wherein the at least one monitoring line includes a plurality of monitoring lines and wherein the connector pins connected to the monitoring lines have substantially the same length.

10. The battery pack of claim 1, further comprising a plurality of connection tabs respectively electrically connecting adjacent battery cells, wherein the lines of the monitoring portion are electrically connected to the battery cells via the connection tabs.

11. The battery pack of claim 1, further comprising an electrically insulating member surrounding an outer surface of the monitoring portion.

12. The battery pack of claim 1, wherein the protective circuit module includes a battery management system (BMS).

13. The battery pack of claim 1, wherein the protective circuit module comprises an analog front end integrated circuit (AFE IC) and wherein the lengths of the connector pins are defined based on the configuration of the AFE IC.

14. A battery pack, comprising:

a plurality of battery cells at least partially connected in series so as to have a positive end and a negative end;

a connector configured to be connected to a protective circuit module and comprising a plurality of connector pins, wherein the connector pins have different lengths; and a plurality of wires respectively electrically connecting the battery cells to the connector pins, wherein the wires include:

a positive current wire electrically connected to the positive end of the battery cells;

a negative current wire electrically connected to the negative end of the battery cells; and a plurality of monitoring wires electrically connected to the battery cells between the positive and negative ends, wherein the connector pins are configured to be electrically connected to the protective circuit module in a sequential order when the connector is inserted into the protective circuit module.

15. The battery pack of claim 14, wherein the connector pins include:

a first connector pin electrically connected to the positive current wire;

a second connector pin electrically connected to the negative current wire; and a plurality of monitoring connector pins respectively electrically connected to the monitoring wires, wherein the length of the second connector pin is greater than that of the other connector pins, and wherein the length of the first connector pin is less than that of the other connector pins.

16. The battery pack of claim 15, wherein the connector pins are sequentially arranged and wherein the monitoring connector pins are interposed between the first and second connector pins.

17. The battery pack of claim 16, wherein the lengths of the monitoring connector pins increase in a direction from the first connector pin to the second connector pin.

18. The battery pack of claim 15, wherein the connector has first and second ends opposing each other, wherein the connector pins are sequentially arranged, wherein the first connector pin is adjacent to one of the first and second ends of the connector, and wherein the second connector pin is positioned near the middle of the connector.

19. The battery pack of claim 18, wherein the lengths of the monitoring connector pins decrease as the distance between the monitoring connector pins and the second connector pin increases.

20. The battery pack of claim 15, wherein the monitoring connector pins have substantially the same length.

* * * * *